(12) United States Patent
Sassenberg et al.

(10) Patent No.: US 8,863,936 B2
(45) Date of Patent: Oct. 21, 2014

(54) APPARATUS FOR TRANSPORTING PACKAGINGS THAT ARE NOT FREELY STACKABLE, IN PARTICULAR STICKPACKS, TO A TRANSPORT CONTAINER

(71) Applicant: MediSeal GmbH, Schloss Holte-Stukenbrock (DE)

(72) Inventors: Dirk Sassenberg, Verl (DE); Michael Pasuch, Bad Salzuflen (DE); Stephan Plewa, Schloss Holte-Stukenbrock (DE); Markus Balsfulland, Bielefeld (DE); Johann Biehl, Schloss Holte-Stukenbrock (DE); Markus Deimel, Bielefeld (DE); Ulf Leineke, Paderborn (DE); Joachim Luecke, Bielefeld (DE); Jan-Karl Nielebock, Bad Salzuflen (DE); Hartmut Ringel, Oerlinghausen (DE)

(73) Assignee: MediSeal GmbH, Schloss Holte-Stukenbrock (DE)

( * ) Notice: Subject to any disclaimer, the term of this patent is extended or adjusted under 35 U.S.C. 154(b) by 71 days.

(21) Appl. No.: 13/768,681

(22) Filed: Feb. 15, 2013

(65) Prior Publication Data
US 2013/0228416 A1    Sep. 5, 2013

(30) Foreign Application Priority Data
Feb. 15, 2012    (DE) .......................... 10 2012 101 221

(51) Int. Cl.
| | | |
|---|---|---|
| *B65G 47/30* | (2006.01) | |
| *B65B 5/06* | (2006.01) | |
| *B65B 35/40* | (2006.01) | |
| *B65B 35/44* | (2006.01) | |
| *B65G 47/46* | (2006.01) | |

(52) U.S. Cl.
CPC ............. *B65G 47/46* (2013.01); *B65B 5/061* (2013.01); *B65B 35/40* (2013.01); *B65B 35/44* (2013.01)
USPC .......... 198/418.6; 198/418.2; 53/447; 53/148

(58) Field of Classification Search
USPC .................. 198/418.2, 418.6, 431, 432, 433; 53/447, 147, 148, 152, 153, 531, 540
See application file for complete search history.

(56) References Cited

U.S. PATENT DOCUMENTS 4,088,555 A * 5/1978 Kita et al. .................... 204/428
5,377,811 A * 1/1995 Tanaka ........................ 198/418.6
(Continued)

FOREIGN PATENT DOCUMENTS

| EP | 1216937 A1 | 6/2002 |
|---|---|---|
| EP | 2055637 A1 | 5/2009 |
| JP | 562-99504 | 6/1987 |

OTHER PUBLICATIONS

European Search Report issued in European Application No. 13155338.0 dated Jul. 29, 2013.

(Continued)

*Primary Examiner* — James R Bidwell
(74) *Attorney, Agent, or Firm* — Venable LLP; Robert Kinberg

(57) ABSTRACT

An apparatus is disclosed for transporting packagings from a packaging apparatus having two dropping channels to a transport container. A first transport element has compartments, the center-to-center distance of which corresponds to a center-to-center distance of the dropping channels, receives the packagings from the packaging producing apparatus. A second transport element has compartments for transporting the packagings to the transport container, wherein the center-to-center distance of the compartments of the second transport element corresponds to half of the center-to-center distance of the dropping channels. The apparatus has a transfer unit for transferring the packaging from the first transport element to the second transport element, and to which a positioning device is assigned for positioning the compartments of the first transport element relative to the compartments of the second transport element.

16 Claims, 6 Drawing Sheets

(56) References Cited

U.S. PATENT DOCUMENTS

| | | | |
|---|---|---|---|
| 6,141,943 A * | 11/2000 | Hart et al. | 53/444 |
| 7,827,767 B2 * | 11/2010 | Bertuzzi et al. | 53/444 |
| 8,079,202 B2 * | 12/2011 | Harrison et al. | 53/447 |
| 8,458,995 B2 * | 6/2013 | Harrison et al. | 53/447 |
| 2011/0226586 A1 * | 9/2011 | Haehnel | 198/418.6 |
| 2013/0001045 A1 * | 1/2013 | Akagi et al. | 198/418.6 |

OTHER PUBLICATIONS

English Translation of European Search Report dated May 17, 2013.
Examination Report for German Application No. DE 10 2012 101 221.0.

* cited by examiner

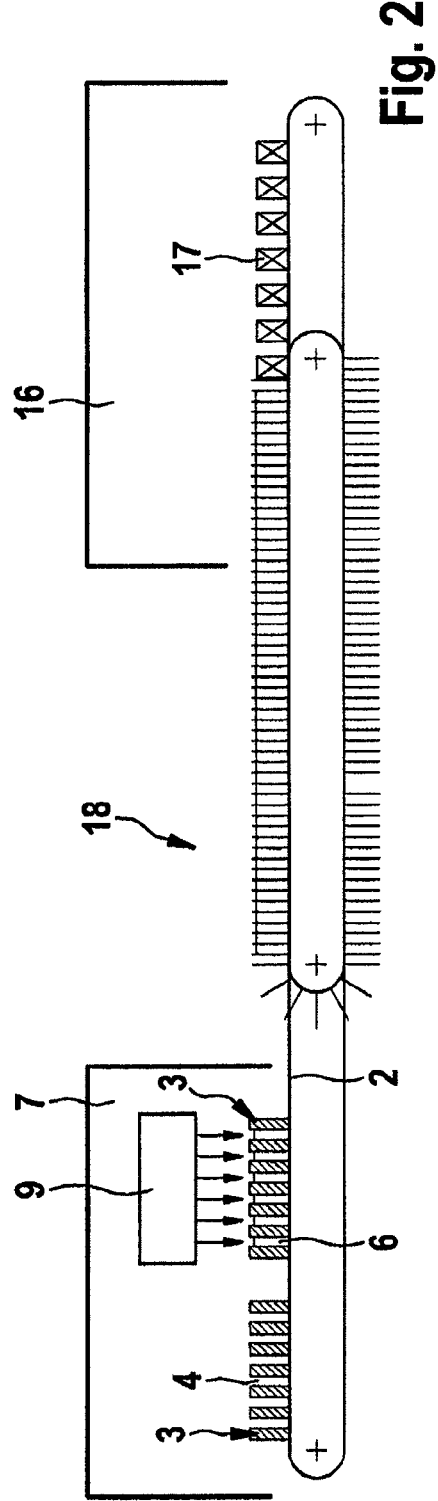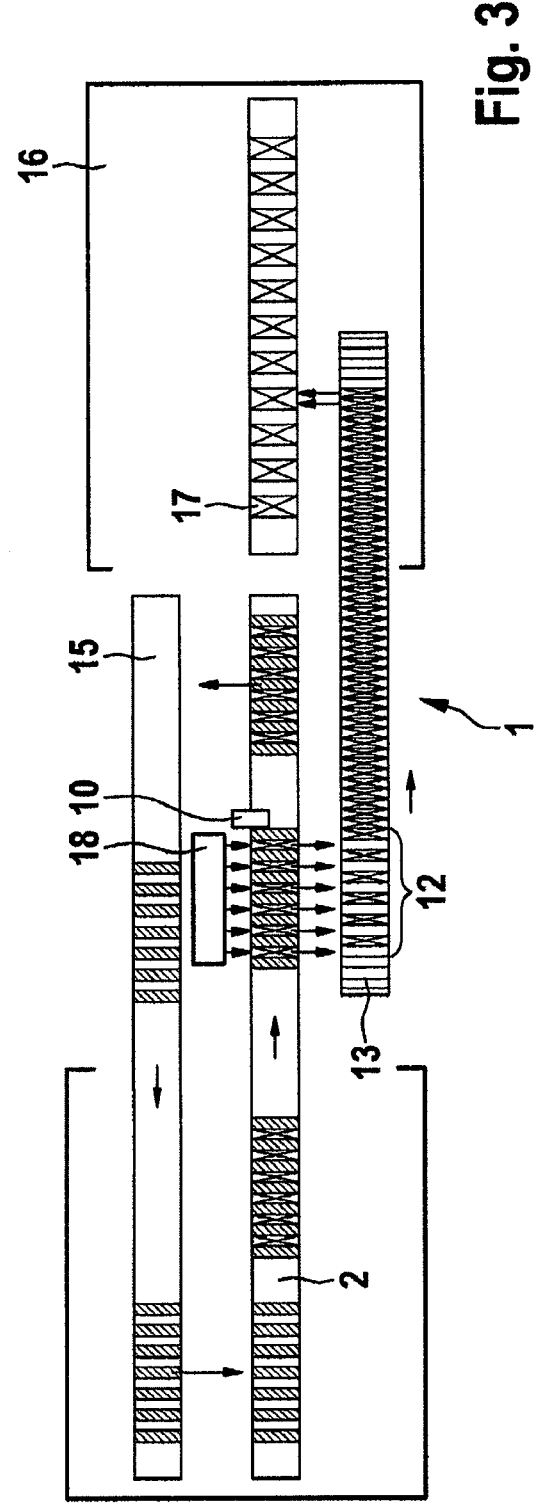

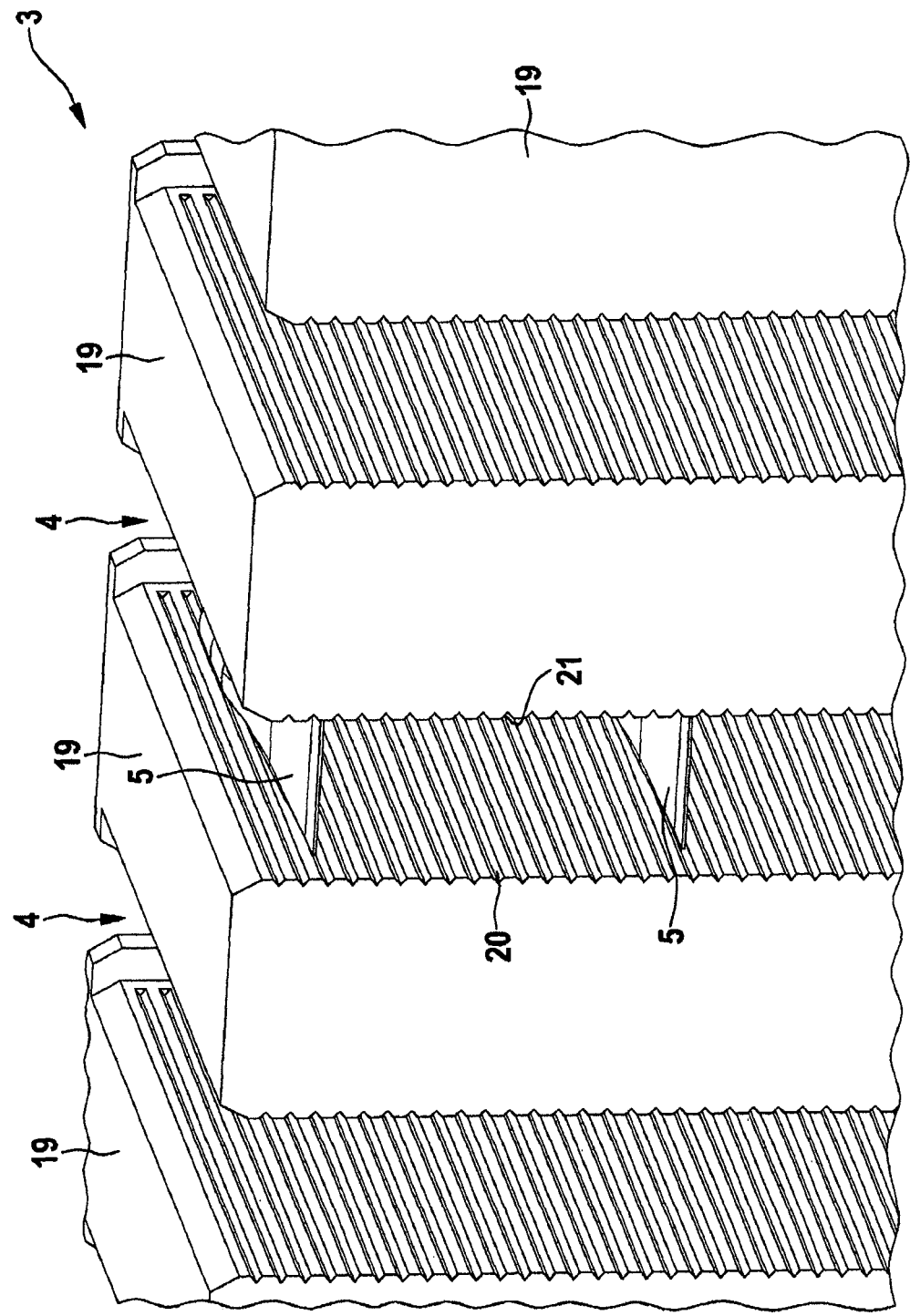

APPARATUS FOR TRANSPORTING PACKAGINGS THAT ARE NOT FREELY STACKABLE, IN PARTICULAR STICKPACKS, TO A TRANSPORT CONTAINER

CROSS-REFERENCE TO RELATED APPLICATION

This application claims the priority of German Patent Application No. 10 2012 101 221.0, filed on Feb. 15, 2012, which is incorporated herein by reference in its entirety.

BACKGROUND OF THE INVENTION

The present invention relates to an apparatus for transporting packagings that are not freely stackable, in particular stickpacks, from a packaging producing apparatus to a transport container in a transport packaging station with simultaneous compacting arrangement of the packaging, the packagings being produced by a packaging producing apparatus having at least two dropping channels which are uniformly or substantially uniformly spaced apart from each other by a centre-to-centre distance P, the apparatus comprising a first transport element having at least one compartment group for receiving the packagings dispensed by the packaging producing apparatus and for transporting the packagings in the direction of a transport packaging station; a transfer unit for transferring the packagings from the packaging producing apparatus to the at least one compartment group of the first transport element and for forming stacks in the compartment group, and a second transport element having at least one compartment group for transporting the packagings to the transport packaging station, wherein each of the compartments of the compartment groups of the first and second transport elements have a width that is equal or substantially equal to the width of the packagings.

The invention further relates to a method for transporting packagings that are not freely stackable from a packaging producing apparatus having at least two dropping channels that are uniformly or substantially uniformly spaced apart from each other by a centre-to-centre distance P, to a transport container in a transport packaging station with compacting arrangement of the packaging.

In the context of the invention, packaging that is not freely stackable is any type of packaging that cannot form a stack with further like packagings without auxiliary means. Such packagings are typically deformable packagings, that is, they do not dispose of a dimensionally stable surface. Such a deformable packaging can adapt to the contents therein or change depending on the shape or position of the contents. Examples of such packaging are stickpacks, bags such as teabags, sacks, tubes or nets. For filling material, particularly fluids, gel-like products, bulk goods such as pellets, granulate or powder, and pieced goods such as sweets or capsules can be considered. Packagings that are not freely stackable are also those that are not freely stackable due to the shape thereof, such as balls or cylinders, if the stacks are formed by placing the lateral surfaces on top of each other. Without auxiliary means, the individual packagings slip while forming stacks and do not remain in the desired arrangement on top of each other. Deformable packagings belong to the packagings that are not freely stackable in the sense of the invention, in any case, even if there may be cases where a stack of a few packagings is stable even without auxiliary means.

The apparatus of the present invention serves to transport packagings that are not freely stackable from a packaging producing apparatus, which produces such packagings, to a transport container in a transport packaging station, in which a plurality of said packagings are combined for transport or for other purposes, for instance into a sales unit or a secondary packaging, wherein the packagings are compacted during transport from the packaging producing apparatus to the transport packaging station. Examples of such transport containers can be cartons, bins, boxes or containers.

The packaging production in the sense of the invention not only comprises the production of the packaging but also the filling thereof with the goods to be packaged.

A compacting of the packaging means a reduction of the distance of the stacks of packagings to each other in the transport process. The distance of ready-packed products when exiting the packaging producing apparatus depends on this apparatus. This distance, however, can be larger than desired for the further packaging process, in particular the further packaging in a transport container. This is explained in more detail using stickpacks as an example:

Stickpack production is vertical, that is, within the packaging production apparatus the produced packagings are transported due to gravity specifically within a plurality of channels arranged in parallel. Measured from the centre of a channel to the centre of the adjacent channel, referred to as the "centre-to-centre distance" P below, these channels have the same lateral distance. In the case of stickpacks, due to the production of the stickpacks, the distance between two stickpacks when exiting the packaging producing machine is approximately twice as large as the width of a stickpack. When exiting the packaging producing machine, stickpacks from the parallel channels are simultaneously collected by a transfer unit, and placed in horizontal alignment into compartments of a compartment group of the first transport element. The number of filled compartments corresponds to the number of dropping channels. Similar to the dropping channels, these compartments, which have a width that is approximately equal to the width of the stickpacks, have a centre-to-centre distance, that is, a distance from the centre of one compartment to the centre of the adjacent compartment, $X=P$. This process is repeated until stacks having the desired number of stickpacks are formed in the compartments. The compartment group is transported further to a further transfer unit, which places the stickpacks into a carton. While disposed in the compartments, the stickpacks form ordered stacks because the width of the compartments is approximately equal to the width of the stickpacks, during further packaging of the stickpacks in the transport container the problem arises that, due to the distance of the individual stacks of stickpacks to each other, the stickpacks slip when being placed into a transport container, and do not remain in stacks. Therefore, an arrangement is desired which allows the stacks to remain as such, and not to slip.

For this purpose, for transporting stickpacks from a loading station at the producing machine, to a carton filling station, document EP 2 055 637 A1 proposes an apparatus to be used that comprises a circular conveyor track, a drive element, and first and second operating means. The circular conveyor track has at least two groups of compartments the number of which is a multiple of the number of the dropping channels, the centre-to-centre distance of which is P/2, and which are designed as compartment segments on belts. The drive elements drive the individual compartment groups independently, and position the compartment groups alternating, first at a loading station and subsequently at a carton filling station. The first operating means collects stickpacks at the loading station, first places them in every second compartment of a first compartment group, which is formed on a first transport belt, and thus forms stacks. When the desired stack height is attained, the first compartment group moves by a distance P/2 in the transport direction, whereupon the respectively second compartments, which are empty till then, can be filled. The compartment group thus filled is then moved to a carton filling station by the drive element, where second operating means push the stack out of the compartments over into a carton. While the first compartment group travels to the carton filling station, a second compartment group which is located on a second transport belt that runs in parallel to the first transport belt, travels to the loading station, and is filled there by the first operating means, in the manner described for the first compartment group.

With the solution according to document EP 2 055 637, by moving the compartment group in the transport direction, a compaction therefore takes place directly in the loading station. Two independently driven compartment groups running next to each other on two transport belts provide that when one compartment group is unloaded at the cartoner, a further group can be loaded at the loading station.

This solution is rigid and inflexible. If better utilisation of the capacities of the loading station and the cartoner is desired, and a third and fourth compartment group are added which are loaded while the first, or respectively the second, compartment group are moving from the loading station to the cartoner, it is necessary to dispose a third and fourth transport belt in parallel next to the first two transport belts. As a result, the apparatus is expansive. Additionally, the operating means require a high degree of mobility in order to allow filling, or respectively emptying of the groups of compartments at the different belts. The arrangement possibilities for stickpack machines with loading station and cartoner are severely limited. Only a serial arrangement is possible because of the transport belts connecting the two devices together. Furthermore, as the transport belts are designed as belts having compartment segments, the apparatus cannot be used for other products, requiring different compartment sizes, without extensive remodeling measures because in each case the entire transport belt must be exchanged.

SUMMARY OF THE INVENTION

It is an aim of the invention to provide a transport apparatus and a transport method, which can better utilise the capacities of loading apparatus and cartoner, which allows for a flexible arrangement of the devices relative to each other, and which can be used flexibly for different packagings.

According to the present invention, this can be solved on the one hand by an apparatus as described hereinbefore in that the compartment group of the first transport element has at least f compartments, and f corresponds to the number F of the dropping channels or a multiple thereof, the centre-to-centre distance X of the compartments of the first transport element corresponds, or substantially corresponds, to the centre-to-centre distance P of the dropping channels (X=P), the centre-to-centre distance Y of the compartments of the second transport element correspond, or substantially correspond to half the centre-to-centre distance P of the dropping channels (Y=P/2), and the apparatus further comprises a second transfer unit for transferring the packagings from the first transport element to the second transport element, wherein the a positioning means is assigned to the apparatus for positioning the compartment group of the first transport element relative to the compartment group of the second transport element.

Due to the invention, the loading process at the packaging producing apparatus is completely decoupled from the loading process at the transport container. At the packaging producing apparatus itself, it is not necessary to move the transport element. The compartment group is filled, and then transported further. Therefore, the first transfer device can be designed very simply, and without being displaceable. Due to the use of two different transport elements for transport away from the packaging producing apparatus and to the transport container in the transport packaging station, any number of compartment groups can be loaded at the packaging producing apparatus without having to provide corresponding additional transport belts for this purpose. Rather, two transport belts are sufficient. By decoupling the loading at the packaging producing apparatus from the insertion into the transport container, it is also possible to have low stack heights at high clock rates and therefore higher performance of the transport packaging station. In addition it is possible to place the two transport belts at an angle other than 180°, which means greater flexibility in the spatial arrangement of the packaging producing apparatus and the transport packaging station for filling the transport containers.

With the present invention the compaction of the stack of packagings is transverse to the transport direction.

The number F of dropping channels can be in particular F=2, 4, 6, 8, 10, 12, 14 or 16, wherein F=10 is particularly preferred. Correspondingly, the number f of compartments of the compartment group of the first transport element is f=F=2, 4, 6, 8, 10, 12, 14 or 16. Additional compartments can be provided to the f compartments. In most cases however, the number corresponds to the number of dropping channels.

If the compartment group of the second transport element also has f compartments, then the stacks from a compartment group of the first transport element are received in the compartment group of the second transport element. This takes place in that firstly the first half of the compartments of the first transport element are aligned with the compartments of the compartment group of the second transport element, and thus every second compartment of the compartment group of the second transport element is filled. If a stack of the desired number of packagings is formed in every second compartment of the compartment group of the second transport element, the compartment group of the first transport element is moved such that now the second half of the compartments of the first transport element are aligned with the still empty respectively second compartments of the compartment group of the second transport element, and can be filled.

Preferably, the compartment group of the second transport element has at least 2f compartments, because this results in a particularly favorable arrangement. In this manner the stacks from respectively two groups of compartments of the first transport element can be received in the compartment group of the second transport element. In doing so, the stacks located in a first compartment group of the first transport elements are initially filled into every second compartment of a compartment group of the second transport element. Subsequently, the compartments of a second compartment group of the first transport element are positioned such that the stacks contained therein can be transferred into the still empty compartments of the compartment group of the second transport element.

The transport elements can have different designs. In one advantageous design, the second transport element is designed as a product cell chain. The product cell chain has uniformly distanced product cells along the entire length. Thereby, it is possible to receive the transferred stack at any location of the product cell chain, that is, a compartment group of the second transport element can be formed at any location of the second transport element.

In another advantageous design, the at least one compartment group of the second transport element and/or the at least one compartment group of the first transport element are designed as cassettes. This has the advantage of a high degree of variability. Thus, filled stacks of packagings can easily be removed for in-process control in order to check, for example, for correct sealing of the packaging or the weight of the contents therein. Furthermore, filled cassettes can be removed from the process for other uses, or additional filled cassettes can be inserted if additional packagings are to be introduced in a transport apparatus for packaging. Additionally, filled cassettes can be extracted and moved to a storage location and stored, if the packaging into transport containers is to be suspended. Thus, the apparatus can be used more flexibly.

The positioning means for positioning the compartment group of the first transport element relative to the compartment group of the second transport element can, for example, be designed very simply, specifically as a movable stop for the cassettes. The compartment group of the first transport element in the form of a cassette is transported on a belt from the packaging producing machine to the second transfer unit. At the second transfer unit, the first and the second transport element must be aligned to each other, so that the stack of packagings can be transferred from the compartments of the first transport element into every second compartment of the second transport element. If the positioning means is designed as a movable stop, the cassette runs against this stop, and is thus fixed for the transfer. The stop can easily be moved and be exactly positioned. A stop as a simple mechanical element is rather fail-safe and therefore low-maintenance.

In a further advantageous design the positioning means is formed by the first transport element, for example, by precisely controlling the first transport element and bringing it to a stop at a position, so that the first transport element is aligned to the second transport element for the direct transfer of the stack of packagings into said second transport element.

In the case of the compartment group of the first transport element being designed as a cassette, it is particularly advantageous if the apparatus further has a return transport element for transporting the empty cassettes from the second transfer unit to the first transfer unit. This return transport element can be designed as a separate transport belt. A pusher can be provided for transferring the empty cassettes onto the separate transport belt. Hence it is possible to automatically return the empty cassettes. In this manner, sufficient empty cassettes are always present at the first transfer unit.

A particularly flexible layout of the apparatus according to the invention can be attained in that, in the case of using cassettes, in that the first transport element is divided into two transport element sections, each having its own individual drive. In this case, one transport element section is assigned to the packaging producing apparatus and the first transfer unit, and the second transport element section is assigned to the second transfer unit. The two transport elements can be driven at different speeds and using different cycling. The cycling at the packaging producing apparatus is thereby independent of the cycling of the second transfer unit. The first transport element section can e.g. be designed as a flighted belt, and the second transport element section as a flat belt. The cassettes must be moved away from the first transfer unit in a relatively short time in order to make space for the subsequent cassette to be filled. Using a flighted belt provides a form-locking connection to the respective cassette, thus enabling a more secure transport even at higher speeds. When designed as a flat belt, the second transport section has a higher friction coefficient than the first transport section. It is thus possible to design the second transport section ascending in order to overcome a possibly present height difference to the transport packaging. Another way for equalizing the height difference is raising the cassettes, e.g. using a lift or a paternoster. In this case, the lift or the paternoster is disposed between the first transport element section and the second transport element section.

It is particularly advantageous if the separating walls, which form the compartments of the compartment groups, of at least one of the compartment groups of at least one of the transport elements have a structured surface. "Structured" according to the invention means that the surface is not smooth but has a structure. Said structure may enhance the friction, e.g. by roughening the surfaces, it may have small grooves or it may be coated with a slightly adherent material. Likewise, the separating walls may dispose of form-locking reception/receptacle such as grooves or chamfers. When stacking the packagings, they are pressed into the compartments, deform slightly, spring back and get caught by the structured surface of the separating walls. This results in the packagings being retained in the compartments by means of friction without the possibility of being twisted. Thus, the packagings are practically barred from shifting.

It is particularly advantageous when the separating walls of the compartments of the first transport element are structured. Likewise, the separating walls of the compartment of the second transport element may be structured. In a solution which is particularly advantageous, the separating walls of the compartments of both transport elements are structured.

The apparatus for transporting packagings that are not freely stackable according to the present invention is an independent unit. However, it can also be a part of a packaging line, which comprises a packaging producing apparatus, the transport apparatus according to the invention and a transport packaging station, for instance a cartoner.

For solving the objective of the present invention, further a method as described hereinbefore is proposed that comprises the following steps:

transferring packagings from the packaging producing apparatus into a compartment group of a first transport element having at least f compartments having a width equal, or substantially equal, to the width of the packaging, wherein f corresponds to the number F of the dropping channels or a multiplicity thereof, and the centre-to-centre distance X of the compartments of the first transport element corresponds, or substantially corresponds, to the centre-to-centre distance P of the dropping channels (X=P), such that a stack of at least two packagings is formed in each of F compartments of the compartment group;

moving the first transport element to a second transfer unit;

positioning the compartment group of the first transport element relative to a compartment group of a second transport element which has at least 2f compartments having a width that is equal, or substantially equal, to the width of the packagings, wherein the centre-to-centre distance Y of the compartments of the second transport element corresponds, or substantially corresponds, to half the centre-to-centre distance P of the dropping channels (Y=P/2), such that each compartment of the compartment group is assigned to an nth (n=1, 3, . . . r) compartment of a group of 2f compartments;

transferring the stack from each compartment of the compartment group of the first transport element transverse to the direction of transport to the compartment group of the second transport element such that initially, each nth compartment of a group of 2f compartments is filled;

moving a further compartment group of the first transport element to the second transfer unit and positioning the compartment group of the first transport element such that each empty (n+1)th compartment of the group is assigned to a compartment of the compartment group of the first transport element;

transferring the stack of at least two packagings from each compartment of the compartment group of the first transport element transverse to the direction of transport at each (n+1)th compartment of the group G of the compartment group of the second transport element; and transporting the group G to a transport packaging station.

With this method, the packagings are compacted during transport, the compacting process being spatially separated from the stacking process.

Advantageously, the method described above is followed by the transfer of at least one stack of packagings to a transport container in a transport packaging station. This process is typically performed by a cartoner. In this process, a single stack can be transferred into the transport container, preferably however, two or more stacks are transferred into the transport container.

For transferring the stack of packagings at the second transfer unit it is necessary that the first transport element and the second transport element are synchronised so that the compartments of the compartment group of the first transport element can be aligned with those of the second transport element in order to enable a transfer of the stacks of packagings. For this purpose, the two transport elements can move side-by-side at the same speed so that the relevant compartments face each other. However, a process is preferred in which the second transport element is stationary at the time of transferring the packagings because then a distinct location is defined for the transfer. Likewise, it is preferred that the second transport element is stationary during the transfer of the packagings to the transport container. In a particulary preferred variant, the transfer times at the second transfer station and at the transport container are coordinated such that a transfer can take place in parallel at the two sites.

The invention is described in the following for a packaging line for stickpacks as an example.

The further features or further developments of the invention described in the following with reference to the accompanying drawings each considered alone or in combination represent preferred embodiments of the invention.

BRIEF DESCRIPTION OF THE DRAWINGS

In the drawings:

FIG. 1a and 1b show a schematic side view of a compartment group of a first transport element of an embodiment of the transport apparatus according to the invention in a loading position beneath a packaging producing apparatus, wherein FIG. 1a shows the compartments filled with one packaging, and FIG. 1b shows the compartments filled with fifteen packagings;

FIG. 2 shows a schematic side view of the embodiment of the transport apparatus according to the invention, integrated into an arrangement with a packaging producing apparatus and a transport packaging station;

FIG. 3 shows a top view of the arrangement shown in FIG. 2;

FIG. 6b is a close-up view of a section of FIG. 6a.

DETAILED DESCRIPTION OF THE PREFERRED EMBODIMENTS

Figure 1A:
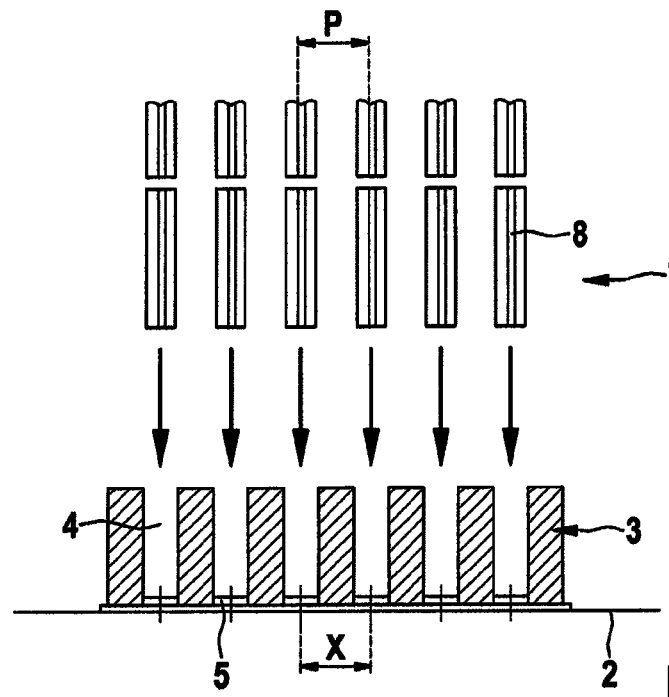
Figure 1B:
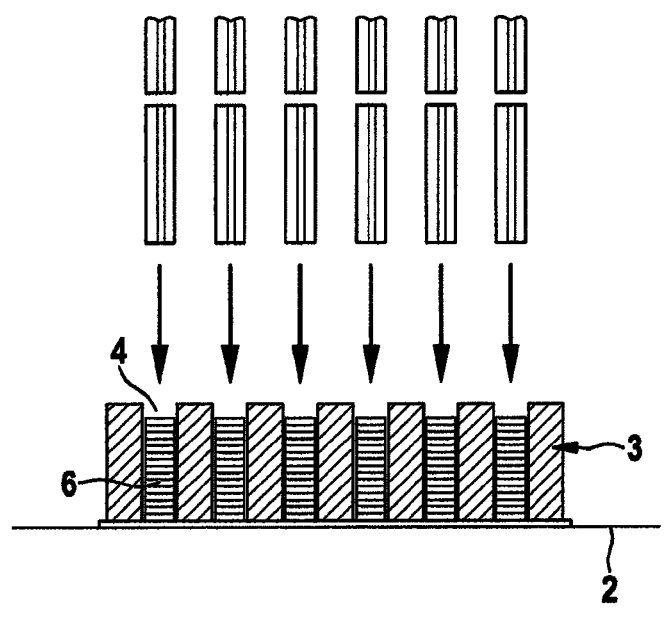

FIG. 1a schematically shows dropping channels 8 of a packaging producing apparatus 7 for producing and filling stickpacks which in the following is referred to as a stickpack machine. The stickpack machine operates on n tracks which are spaced apart from each other by a centre-to-centre distance P. Correspondingly, the dropping channels 8 at the end of the tracks also have a spacing P which corresponds approximately to double the width of a stickpack. In the embodiment shown the number of tracks and dropping channels is F=6, but typically values also are particularly F=2, 4, 8, 10, 12, 14 or 16. The ready-produced stickpacks 5 fall out of the dropping channels 8. A compartment group 3 of a first transport element 2, 3 designed as a cassette is disposed beneath the stickpack machine such that the compartments 4 of the cassette 3 are each disposed exactly beneath a dropping channel 8. This position is the loading position of the cassette. Cassette 3 of the embodiment shown has f=6 compartments corresponding to the six dropping channels of the stickpack machine. The stickpack machine operates clocked, generally with 60 clock cycles per minute. However other clock cycles between 40 clock cycles per minute and 70 clock cycles per minute are also typical. In each clock cycle, the stickpack machine using a first transfer unit 9, simultaneously places one of the produced F stickpacks in each of the f compartments 4 of the cassette 3. The cassette has the division X=P, that is the division of the cassette is equal to the division of the stickpack machine 7. With each clock cycle, the stickpack machine stacks into the cassette 3 until the desired stack height is attained. The stack 6 shown in the FIG. 1b has a stack height 15. The stack height can also take on other values equal to or greater than 2. The stack height is limited by the height of the walls of the cassette 3.

The apparatus according to the invention and the transfer process performed therewith is described in the following with reference to the FIGS. 2 and 3. FIG. 2 shows a schematic side view and FIG. 3 shows the same arrangement in a schematic top view.

FIG. 2 is a schematic side view. A cassette 3 is located in a loading position beneath the dropping channels of the stickpack machine indicated by arrows. The compartments 4 of the cassette are already filled with stacks of stickpacks 6. A further cassette 3, the compartments 4 of which are still empty, is located behind the cassette 3 in the transport direction. When the cassette 3 is filled with the F stacks, the cassette is transported by a first transport element 2, which is designed as a flighted belt, from the loading position beneath the stickpack machine 7 in the direction of the transport packaging station 16 designed as a cartoner. The empty cassette 3 located behind the filled cassettes is brought into the loading position due to the movement of the transport belt 2. The transport element 2 can also be designed as two transport belts in the form of two transport element sections. In this case, two different types of transport belts can be used, for example a flighted belt for the first transport belt and a flat belt for the second transport belt. In this case, the filled cassette 3 in this case is pushed from the flighted belt onto the flat belt, on which the cassette is transported to a second transfer unit 18. By using two transport element sections it is possible to overcome a height difference, in that one belt is designed ascending, or by arranging a lift or a paternoster between the two transport element sections. In this case, the filled cassette is transferred from the first transport element section into a lift and moved upward. At the upper end, the cassette is pushed by means of a pneumatic pusher for the purpose of being transported to the second transfer unit on the second transport element section, which is designed as a flighted belt.

At the transfer unit 18, the cassette 3 is stopped using a positioning means 10, which in the present example embodiment is constructed as a movable stop, and is positioned such that the compartments 4 of the cassette 3 filled with stacks 6 are aligned with the compartments 11 of the compartment group 12 of a second transport element 13, which in this example is implemented as a product cell chain, so that the stacks can be pushed from the cassette 3 into the compartments 11 of the compartment group 12 of the product cell chain 13.

Figure 4A:
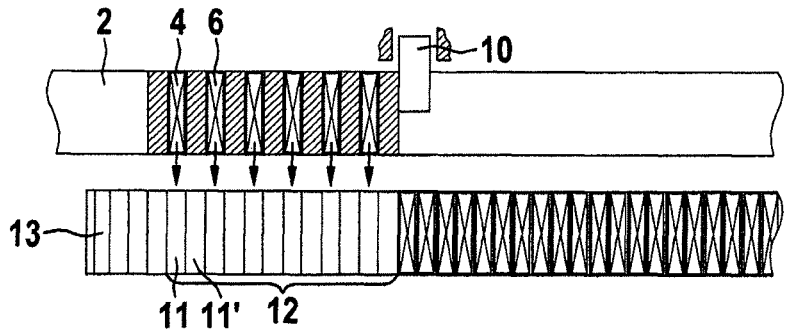
FIG. 4 a to d show a schematic representation of the steps of transferring the stack of packagings from the compartment group of the first transport element to the compartment group of the second transport element in the second transfer unit according to the embodiment.

FIG. 4a to 4d show the individual steps in the transfer process between cassette 3 and product cell chain 13. Whilst the cassette has the division X=P, the division of the product cell chain is X=P/2. FIG. 4a shows the cassette 3 which was stopped and positioned by movable stop 10. The positioning occurs in such a manner that each filled compartment 4 of the cassette 3 is facing an empty compartment 11 of a compartment group 12 of the product cell chain 13. The compartment group of the product cell chain in the embodiment shown comprises twelve compartments.

Figure 4B:
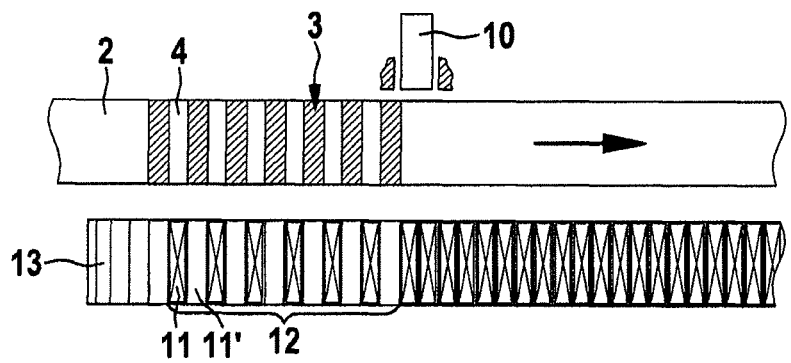

Using a pusher 18, the F stacks are simultaneously pushed using a pusher 18 from the cassette 3 into the product cell chain 13. During the pushing process, the product cell chain is stationary or moves synchronously with the cassette. As shown in FIG. 4b, initially only every nth compartment 11 (n=1, 3, 5, 7, 9, 11) of the compartments 11 of a compartment group of the product cell chain is filled with a stack of stickpacks. Every (n+1)th compartment 11' remains empty. Thus, an empty compartment 11' is always located between two filled compartments 11.

The stop 10 is loosened in the next step. The now empty cassette 3 is transported further and, using a pusher (not shown), is pushed transverse onto a return transport belt 15 running back to the stickpack machine. The return transport belt 15 is shown in FIG. 3. In the region of the stickpack machine, the cassette 3 is pushed onto the flighted belt 2 again by a further pusher (not shown), which flighted belt 2 initially transports the cassette 3 into the loading position beneath the dropping channels 8 again.

Figure 4C:
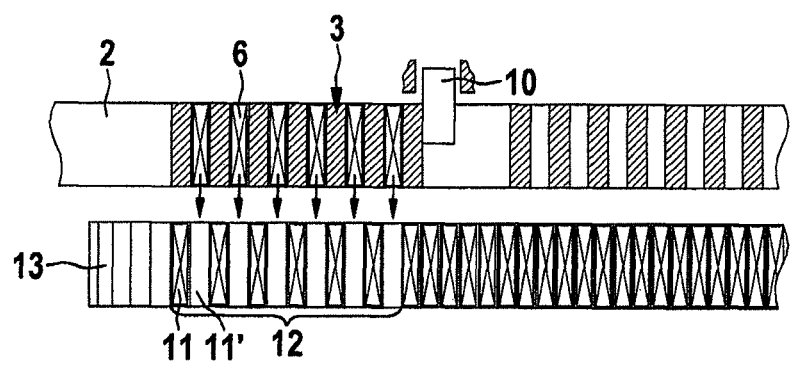
Figure 4D:
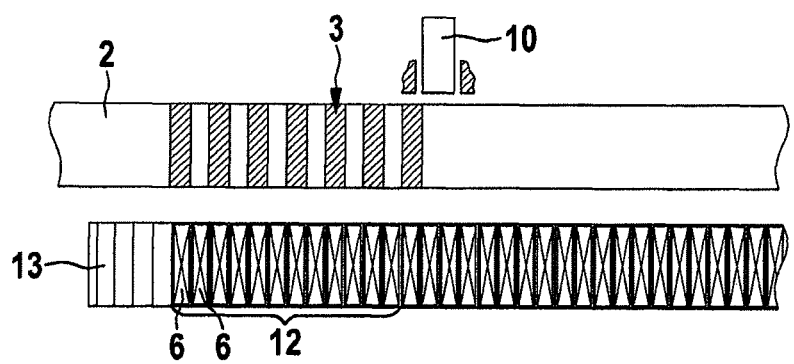

In the transfer region, the next cassette 3 is stopped and positioned by movable stop 10 such that the F stacks of this cassette are located opposite the still empty compartments 11' between the already filled compartments 11 of the compartment group 12 of the product cell chain 13. This arrangement is shown in FIG. 4c. The F stacks of stickpacks are pushed simultaneously into the still empty compartments 11' of the product cell chain. FIG. 4d shows how now all compartments 11, 11' of the compartment group 12 of the product cell chain 13 are filled with stacks of stickpacks 6, whilst the compartments 4 of the cassette 3 are empty. The empty cassette 3 is pushed onto the return transport belt 15 and transported back to the stickpack machine.

Figure 5A:
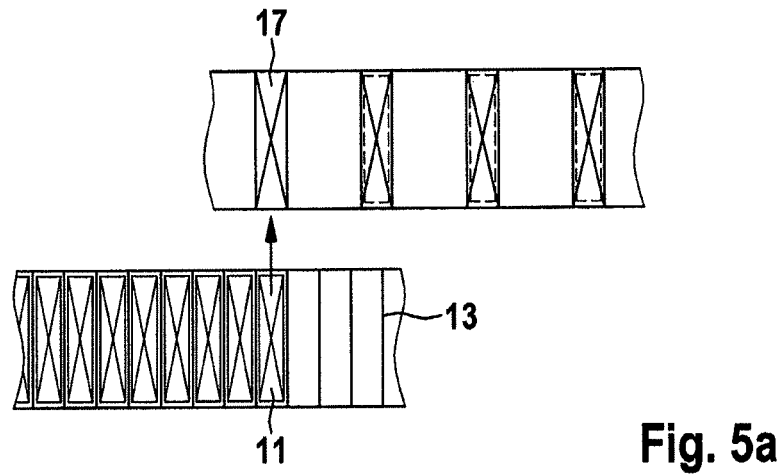
FIG. 5a to 5c show a schematic representation of filling the transport apparatus in the transport packaging station in different sized transport containers, specifically in FIG. 5a for a transport container, which can receive one stack of packagings, in FIG. 5b for a transport container, which can receive two stacks of packagings, and in FIG. 5c for a transport container, which can receive threes stacks of packagings.
Figure 5B:
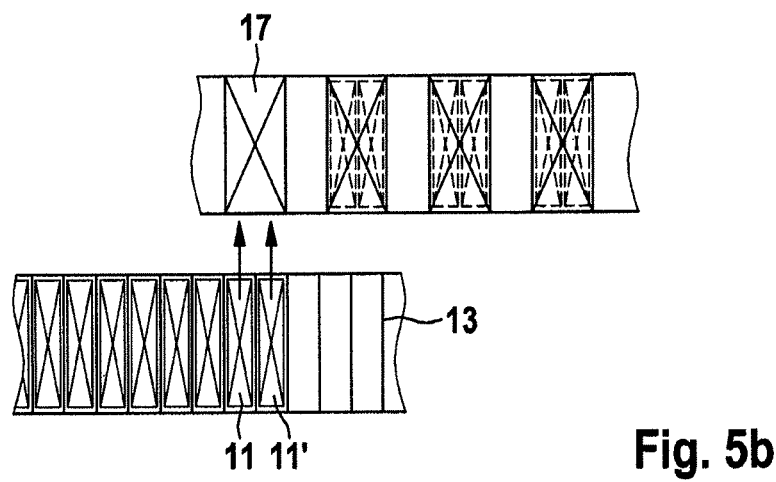
Figure 5C:
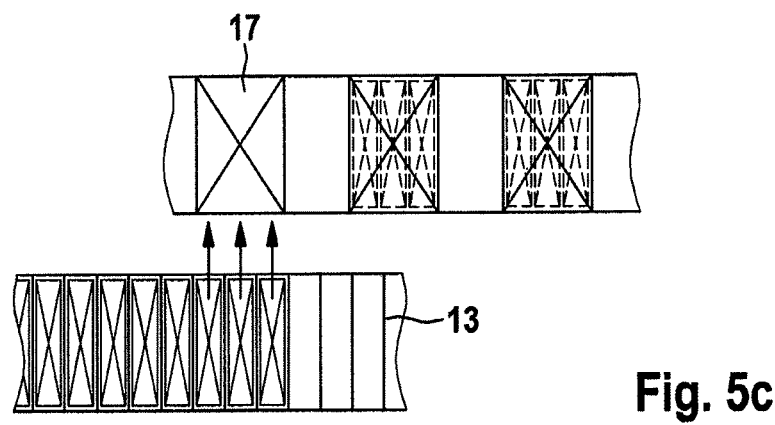

The product cell chain 13 is cycled to the slide-in region of the cartoner 16. At the cartoner, m stacks of stickpacks (m=1, 2, 3, 4, 5) are simultaneously pushed into a carton 17. The product cell chain is stationary whilst the stacks are pushed in. After the push-in, the product cell chain is cycled further so that the next m stacks of stickpacks can be pushed-in. FIG. 5a to 5c show the positioning of the compartments of the product cell chains relative to the cartons in the cartoner for the case of packaging 1, 2 or 3 stacks of stickpacks. FIG. 5a shows an arrangement with pushing only one stack of stickpacks into a carton. FIG. 5b shows how two stacks of stickpacks are further packaged into a carton. Finally, FIG. 5c shows how three stacks of stickpacks are brought together into one carton.

Figure 6A:
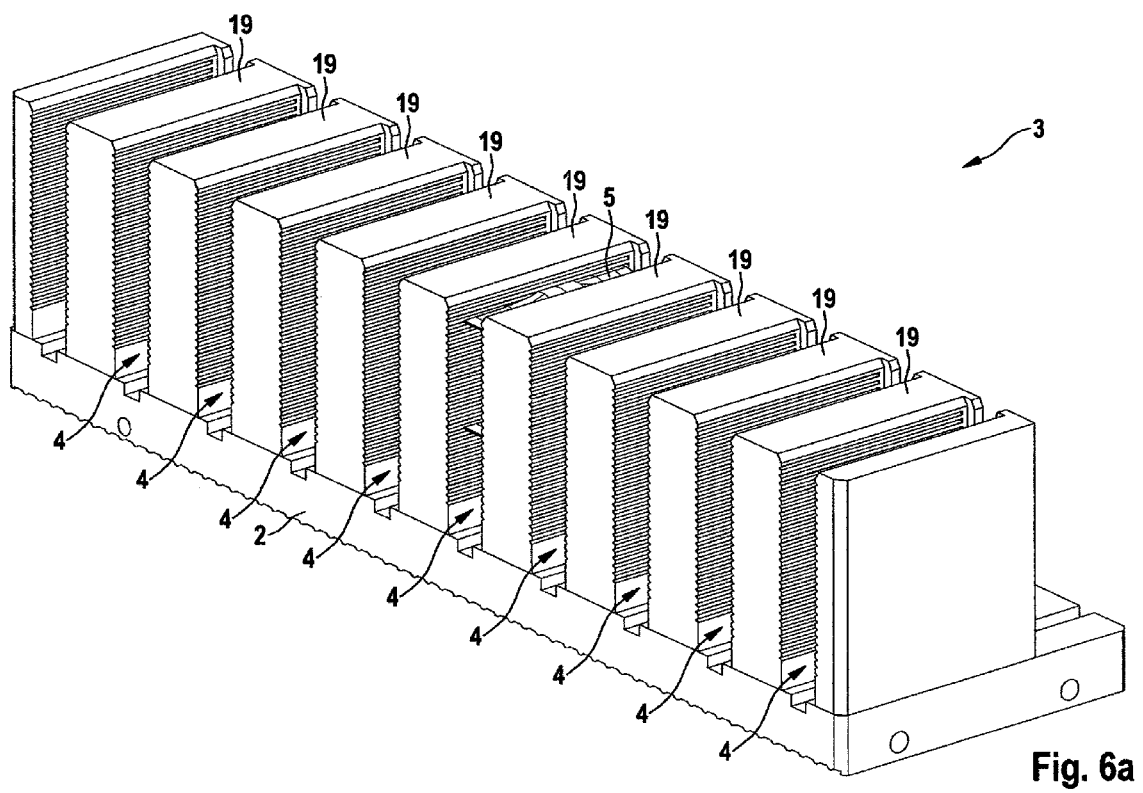
FIG. 6a shows a transport element in which the surfaces of the separating walls of the compartments are structured.

FIG. 6a and 6b show an embodiment in which separating walls 19 of compartments 4 have a structured surface, as they have grooves 20, 21. When stacking stickpacks 5 underneath the packaging producing apparatus 7 stickpacks 5 are pressed into compartments 4 of cassette 3. The stickpacks 5 slightly deform, but they spring back and generally get caught by grooves 20, 21. During this process, it happens that the front and the rear seam/weld of a stickpack do not get stuck in corresponding grooves of the respective separating wall of the same height, but that e.g. the rear seam/weld gets stuck in a groove 20 of the one separating wall, whereas the front seam/weld gets stuck in a grove 21 of the opposite separating wall, which groove 21 is higher or lower by one than groove 20 of the first separating wall. This results in the stickpack 5 being retained in the cassette 3 by means of friction without the possibility of being twisted.

What is claimed:

1. An apparatus for transporting packagings that are not freely stackable from a packaging producing apparatus to a transport container in a transport packaging station with simultaneous compacting arrangement of the packagings, the packagings being produced by the packaging producing apparatus, having at least two dropping channels, which are uniformly or substantially uniformly spaced apart from each other by a centre-to-centre distance P, the apparatus comprising:

a first transport element having at least one compartment group adapted to receive the packagings dispensed by the packaging producing apparatus and transport the packagings in the direction of the transport packaging station;

a transfer unit adapted to transport the packagings from the packaging producing apparatus to the at least one compartment group of the first transport element and form stacks in the compartment group;

a second transport element having at least one compartment group adapted to transport the packagings to the transport packaging station, the compartments of the compartment groups of the first and the second transport element each having a width equal or substantially equal to the width of the packagings, wherein:

the compartment group of the first transport element has at least f compartments, and f corresponds to the number F of the dropping channels or a multiplicity thereof, a centre-to-centre distance X of the compartments of the first transport element corresponds (X=P) or substantially corresponds to the centre-to-centre distance P of the dropping channels, a centre-to-centre distance Y of the compartments of the second transport element corresponds or substantially corresponds to half (Y=P/2) the centre-to-centre distance P of the dropping channels, and the apparatus further comprises a second transfer unit adapted to transfer the packagings from the first transport element to the second transport element, wherein a positioner is assigned to the apparatus for positioning the compartment group of the first transport element relative to the compartment group of the second transport element.

2. The apparatus according to claim 1, wherein the compartment group of the second transport element has at least 2f compartments.

3. The apparatus according to claim 1, wherein the second transport element comprises a product cell chain.

4. The apparatus according to claim 1, wherein the at least one compartment group of the second transport element comprises a cassette.

5. The apparatus according to claim 1, wherein the at least one compartment group of the first transport element comprises a cassette.

6. The apparatus according to claim 4, wherein the positioner comprises a movable stop for the cassette.

7. The apparatus according to claim 5, further comprising a return transport element adapted to transport the empty cassettes from the second transfer unit to the first transfer unit.

8. The apparatus according to claim 1, wherein the first transport element is divided into a first transport element section having its own individual drive, and a second transport element section having its own individual drive.

9. The device according to claim 1, wherein the positioner is formed by the first transport element.

10. The device according to claim 1, wherein the compartments are formed by separating walls, wherein the separating walls of compartments of at least one of the compartment groups of at least one of the transport elements has a structured surface.

11. A method for transporting packagings that are not freely stackable from a packaging producing apparatus having at least two dropping channels that are uniformly or substantially uniformly distanced from each other by a centre-to-centre distance P, to a transport container in a transport packaging station with a compacting arrangement of the packaging, comprising:
transferring packagings from the packaging producing apparatus into a compartment group of a first transport element having at least f compartments with a width equal, or substantially equal, to the width of the packagings, wherein f corresponds to a number F of the dropping channels or a multiplicity thereof, and a centre-to-centre distance X of the compartments of the first transport element corresponds, or substantially corresponds, to a centre-to-centre distance P of the dropping channels (X=P), such that a stack of at least two packagings is formed in each of F compartments of the compartment group;
moving the first transport element to a second transfer unit;
positioning the compartment group of the first transport element relative to a compartment group of a second transport element which has at least 2f compartments having a width that is equal, or substantially equal, to the width of the packagings, wherein a centre-to-centre distance Y of the compartments of the second transport element corresponds, or substantially corresponds, to half the centre-to-centre distance P of the dropping channels, (Y=P/2), such that each compartment of the compartment group is assigned to an nth (n=1, 3, 5, . . . r) compartment of a group of 2f compartments;
transferring the stacks from each compartment of the compartment group of the first transport element transverse to the direction of transport to the compartment group of the second transport element such that initially, each nth compartment of a group of 2f compartments is filled;
moving a further compartment group of the first transport element to the second transfer unit and positioning the compartment group of the first transport element such that each empty (n+1)th compartment of the group is assigned to a compartment of the compartment group of the first transport element;
transferring the stacks of at least two packagings from each compartment of the compartment group of the first transport element transverse to the direction of transport at each (n+1)th compartment of the group G of the compartment group of the second transport element; and transporting the group G to a transport packaging station.

12. The method according to claim 11, wherein that at least one stack of the stack of packagings located in the compartments of the group G is transferred at the transport packaging station into a transport container.

13. The method according to claim 11, wherein the second transport element is stationary during the transfer of packagings into the second transfer unit at the second transport element and/or during the transfer of the packagings into the transport container.

14. A transport line for transporting packagings that are not freely stackable comprising: a packaging producing apparatus adapted to produce packagings that are not freely stackable; a transport packaging station adapted to further package the packagings that are not freely stackable into a transport container; and a transport apparatus according to claim 1.

15. The apparatus according to claim 1, wherein the packagings that are not freely stackable comprise stickpacks.

16. The method according to claim 11, wherein the packagings that are not freely stackable comprise stickpacks.

* * * * *